May 31, 1955  R. V. MEYER  2,709,751
INFRARED CONCENTROMETER
Filed Jan. 17, 1951
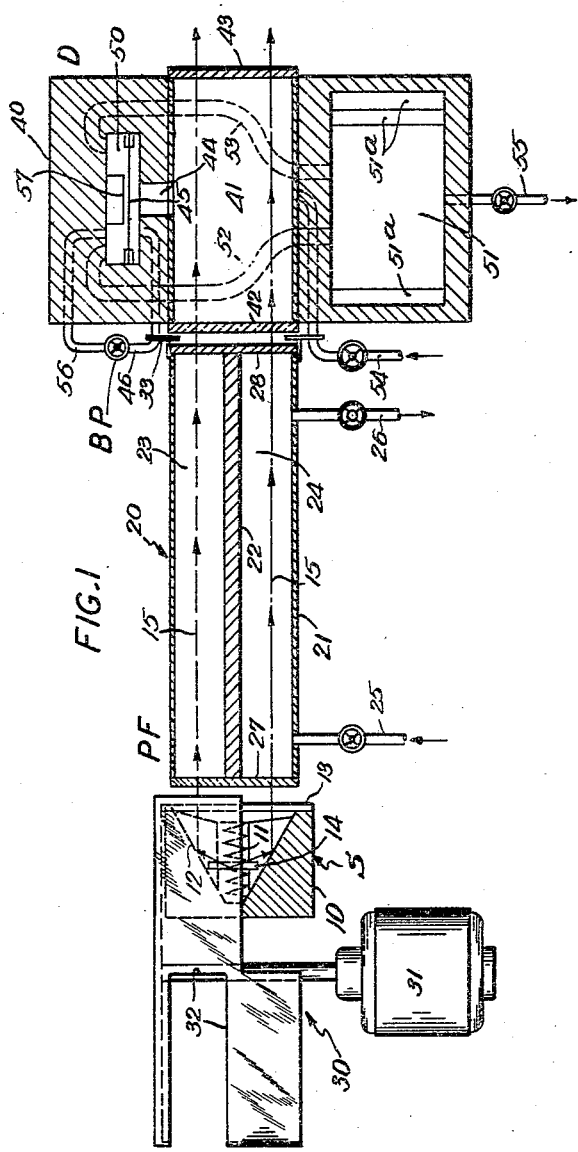
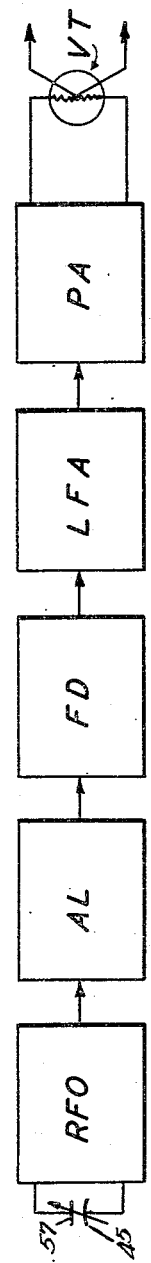
INVENTOR
ROBERT V. MEYER
BY Emery, Booth, Townsend, Miller & Weidner
ATT'YS.

United States Patent Office 2,709,751
Patented May 31, 1955

2,709,751

INFRARED CONCENTROMETER

Robert V. Meyer, South Lincoln, Mass., assignor, by mesne assignments, to The Foxboro Company, Foxboro, Mass., a corporation of Massachusetts Application January 17, 1951, Serial No. 206,410

8 Claims. (Cl. 250—43.5)

The present invention relates generally to infrared spectroscopy, or the measurement of the concentration of gases, liquids and solids by means of their infrared radiation absoption characteristics. More particularly the invention is embodied in a positive filter infrared absorption analyzer, using a single source and single detecting element with chopped radiation alternating between a reference and a sample cell.

Important considerations in the design and construction of an analyzer as here concerned include the provision of a regulated light source producing a uniform or constant intensity beam; a detector chamber compensated for vibration and other external effects; and a sensitive and accurate measuring unit requiring low power and adapted to supply remote recording instruments. These and other objects and requirements are met by the apparatus of the present invention, to which for commercial purposes and sponsor identification I apply the designation and trade-mark infrared "concentrometer," in an advantageous manner and through the use of certain constructional improvements to be explained hereinafter.

My invention will be more fully understood by reference to the following description, taken in conjunction with the accompanying drawing, in which:

Fig. 1 is a partly schematic and diagrammatic view of the apparatus as a whole; and Fig. 2 is a schematic showing of the electronic measuring and indicating system provided with the instrument.

The quantitative analysis of gaseous and other components, as a phase of process control, particularly combustion control, and for detection purposes generally by the method of the present invention depends upon the selective absorption of infrared radiation. As is well known, the atoms in any molecule are constantly vibrating with definite characteristic frequencies. These frequencies are of the same order of magnitude as those of infrared radiation. When the molecular vibration is of a frequency identical with or sympathetic to that of the radiation, absorption occurs. In such quantitative analysis a frequency is chosen which possesses high absorption for the component to be measured with low absorption of other components. The absorption is related to the concentration by the Beer-Lambert law. If the transmission for a pure gas or other component is known, the concentration in a sample mixture may be calculated from the transmission for the mixture. My novel analyzer is therefore adapted to the measurement of the concentration of one or more gas or liquid components in a continuously flowing sample which has an absorption band in the near infrared range in the presence of any number of other components.

Referring now more particularly to the preferred embodiment illustrated in the drawings, a single source of constant intensity infrared radiation is indicated generally at S, and will be seen to comprise a chamber or housing 10, which may be stainless steel, in which is sealed an emitter 11, which may be any desired or suitable heater or filament as for example a Nichrome or platinum wire. Housing 10 is provided also with a reflector 12 collimating the rays from the emitter 11 through source window 13. In accordance with the invention, window 13 is sealed to withstand a considerable vacuum or pressure, not less than 30 p. s. i. g. (pounds per square inch, gauge), and is desirably of round or disc-like configuration. Numerous infrared transmitting materials are available for the windows of absorption analyzers and the like infrared sensing devices, but I have found it convenient, at least in the case of the light source, to employ silver chloride for the composition of such window, as having a fairly low absorption over the infrared range.

Infrared radiation emitted is proportional to the absolute temperature of the emitting substance, which is proportional to the energy input and the energy output. Control of the temperature of the emitter rather than the power input is thus required for desired constant intensity radiation independent of the source of energy and of the heat losses from the emitter. Accordingly housing 10 may be evacuated to minimize the mentioned heat loss, and a self-contained temperature sensing element 14 of known design is provided for regulating the input to effect the desired uniform radiation.

The energy radiated from the described single source is focused by reflector 12 in parallel rays 15 aggregating a radiant column. In accordance with the invention, means are provided for modifying or more particularly dividing and interrupting said column to provide alternately emitted beams representative respectively of the energy incident upon and absorbed by a sample of the component to be detected. Said column modifying means is indicated generally at PF and includes a filter chamber 20 enclosing the required reference and component sample volumes, a beam interrupting device 30, and a light trimming element 33.

The filter chamber is constituted by a rigid tube or cylinder 21, desirably fashioned of stainless steel, and mounted centrally of the path of the infrared column and paralleling rays 15. To minimize radiation in the chamber the cylinder wall is ground and polished to an optical finish. Cylinder 21 is partitioned lengthwise as by plate 22, to define reference and sample cells 23 and 24. In forming the cells 23, 24, the cylinder is bisected and then welded, preferably under water, as for preserving the mentioned optical finish, to plate 22. Valved passages for providing a continuous flow of a component sample at desired pressures through sample cell 24 are indicated at 25 and 26. A suitable reference volume will be sealed in reference cell 23.

The ends of cylinder 21 are closed by pressure sealed windows 27 and 28, fashioned, like source window 13, of a suitable infrared transmitting material, such as the hereinbefore mentioned silver chloride. Where carbon monoxide or ammonia are to be measured, sodium or calcium chloride are preferable, as they have lower absorption rates in the ranges concerned. It is here noted that the several infrared transmitting windows of the apparatus are made progressively larger in the direction of travel of rays 15 to avoid energy loss resulting from their misalignment, as may be caused by stresses arising in the instrument. It will be understood also that the optimum length for the cylinder depends on the absorption characteristics of the component which is to be measured in any particular application of the invention.

Further in accordance with the invention the constant intensity radiation from source S is chopped or interrupted to provide alternate, intermittent sample and reference beams by a rotary light interrupting device or drum 30, driven by motor 31, and mounted to interdict the radiant column between source S and filter chamber 20 and to rotate about an axis normal to the plane of the radiant column 15.

It is noted that certain prior art devices of the double beam type have employed rotary disc interrupters mounted to rotate about an axis paralleling the light beam, and having a circular blade or shutter apertured along an inner radius through one half and along an outer or peripheral radius through the other half, so as alternately to interdict the upper and lower or right and left halves of the radiant beam. It has been demonstrated that these rotary disc interrupters have an unsymmetrical chop, or more particularly cover and uncover the sides of the filter chamber at varying rates at the instant of cross over, as a consequence of the different positioning of the resultant semi-circular panels radially of the shutter, thereby introducing undesired background or noise into the final or produced signal. It has been found also that the background pip or noise in said signal at the moment of cross over resulting from the inherently uneven or varying intensity radiation from element 11 is magnified by such unsymmetrical chop of interrupters of the type described.

Rotary light interrupting drum 30 will be seen to have a contrastingly symmetrical chop, in that the alternate upper and lower drum blades 32 interdict the beam 15 while moving transversely rather than circumferentially thereof, and therefore cover and uncover the reference and sample cells at equal rates throughout the cross over interval. It will be appreciated that by the provision novelly of a drum type beam interrupting device, as described, I have avoided the introduction of the undesired background disturbance which has resulted heretofore from an uneven interruption of the radiant column.

The instrument may be calibrated in the field for optimum balance, that is, equalization of the reference and sample beams, by adjustment of light trimming element 33, which may comprise any suitable manually operable masking device or shutter introduced between light source S and filter chamber 20. It will be understood that the above mentioned normal unbalance of the light source "hot spots" may require such adjustment to equalize the radiation passing to either side of partition 22. Such equalization of the beam intensities may be effected additionally or alternatively, as desired, by mounting the light source to rotate about the axis of the radiant column 15 and filter chamber 20.

Further in accordance with the invention there is provided a detector unit, indicated generally at D, incorporating a suitable detecting or absorbing volume receiving energy alternately from the reference and sample beams and thus detecting the energy quanta absorbed from the former by the component sample in the filter chamber. In the preferred embodiment described herein the detector unit comprises a block 40, which may be stainless steel, mounted adjacent filter chamber 20, and bored transversely to provide a cylinder or cell 41 substantially coterminous and exactly coaxial with filter chamber 20 and radiant column 15, and sealed at opposite ends by infrared transmitting windows 42, 43. Like the light source and filter chamber optics already described, windows 42 and 43 are vacuum tight and designed to withstand pressures over 30 p. s. i. g.

Detector cell 41 is filled with the aforementioned absorbing volume in a manner later to be described. It will be understood that the energy loss from the sample beam as a result of the absorption in component sample cell 24 is reflected or expressed in cell 41 by intermittent pulses of heat and pressure in said volume, which pulses are proportional in amplitude to the difference of the energy levels effected in the detector chamber by the two beams, such energy difference being proportional also to the concentration or length of path of the infrared absorbing component sample. It will be obvious that accurate measurement of the temperature changes would be difficult, particularly as they are very much smaller than normal or ambient temperature variations. Therefore, detector unit D further comprises in accordance with the invention highly sensitive means for registering the pressure pulses.

In the illustrated embodiment such means is shown as housed in a relatively small, elongated detecting or metering chamber 50 positioned in block 40 relatively close to and paralleling cell 41, and communicating therewith through a suitable passage 44. A thin elastic membrane or diaphragm 45 is seen to partition this metering chamber 50, being suspended at its edges for free flexure therein responsive to the mentioned pressure pulses. In accordance with the invention diaphragm 45 is fashioned of an electrically conductive material, as for example aluminium or other metallic foil, and forms the variable electrode of a condenser microphone, as will more fully appear hereinafter.

My present invention novelly provides also a pneumatic ballast system for compensating the described detecting unit for sensitivity of the pressure sensing element to vibration effects. As indicated in Fig. 1, the vibration cancelling means herein comprises a ballast volume housed severally by ballast chamber 51, passages 52 and 53 connecting the chamber with microphone chamber 50 oppositely of the absorbing volume, and valved fill and exhaust passages 54 and 55. In accordance with the invention, the ballast volume is given a mass having a fixed, predetermined relation to the combined mass of the absorbing volume and pressure sensing element 45, and is arranged to have its center of gravity geometrically opposed to that of said absorbing volume whereby acceleration of the same perpendicular to the plane of said variable electrode is substantially compensated or nullified. It should be noted that the ballast-detector volume relationship or proportionality may readily be controlled or adjusted to that desired or preferred for the gases variously employed for absorption by varying the volume of chamber 51, as by removable filler blocks 51a. The ballast volume is thus proportioned and arranged to effect at one face of diaphragm 45 and as a consequence of its inertia, a relative pressure or vacuum equal and opposite to that generated at the opposite face by the combined detector volume and diaphragm masses whenever the instrument is subjected to such vibration.

The detector D is characterized further and novelly by a diaphragm bypass means for equalizing the static pressures in the ballast and absorbing volumes. It will be understood that a minimum equalizing "bleed" occurs normally as a result of some porosity inherent in the aluminum or other metal foil of which the variable electrode 45 is constituted as hereinbefore mentioned. While such bleed might be adjusted by providing a pin hole to increase the bleed, such expedient would be at the expense of sensitivity and accuracy in the instrument. In accordance with the present invention and for this purpose the absorbing and ballast volumes include respectively passages 46 and 56 communicating with microphone chamber 50 through bypass valve BP, which may be a sensitive needle valve, and which may be adjusted to equalize static ballast and detector pressures at any desired rate, or as may be consonant with the speed of chop or alternation of the radiant beams by interrupter 30. It will be appreciated that the described bypass means additionally permits desired resensitizing or flushing of the detector and ballast volumes without the necessity of interference with or the likelihood of injury to the condenser microphone.

My novel "concentrometer" is characterized further by a highly sensitive, noise limited electronic system for measuring, indicating, recording and/or controlling the component sample concentration as represented by the pressure pulses generated in detector cell 41. As schematically indicated in Fig. 2 such system or means includes successively means for converting capacity changes to frequency variations, frequency demodulation means for producing low frequency voltages, and an output device producing low impedance D. C. voltages which are proportional to the amplitude of the said low frequency voltages, and which are adapted to be recorded by conventional or preferred means.

It will be recalled that the pressure sensing diaphragm 45 constitutes in accordance with the invention the variable electrode of a condenser microphone. Chamber 50 is seen to house also the fixed electrode 57 of said condenser, which is mounted to lie in a plane close to and paralleling diaphragm 45, whereby the pressure pulses in cell 41 which effect flexure of the diaphragm are reflected also by proportional changes in the spacing of fixed and variable electrodes 45, 57. It should be noted that in accordance with the improved design of the measuring and indicating unit provided with the analyzer such electrode spacing may be on the order of 0.0009 in. The microphone is thus designed for sensitivity to very small changes in detector cell pressure.

It will be understood that the pressure pulses in cell 41 are converted to electric signals through the medium of the described condenser microphone, which forms the capacitive portion of the radio frequency oscillator RFO. The instantaneous pressure differential established across flexible diaphragm 45 by energy absorption in cell 41 and producing changes in the electrode spacing is thus reflected also in changes in the microphone capacitance. Capacitance changes are converted to frequency changes in the radio frequency oscillator RFO. The resultant frequency changes are detected by conventional or preferred FM means, here shown as including amplitude limiter AL, frequency discriminator FD, and low frequency amplifier LFA. It will be appreciated that such frequency discriminator system as novelly applied herein is sensitive to changes in the microphone capacitance of less than one part in ten million, or an electrode displacement of less than $10^{-10}$ inches. The low frequency signal detected by the FM system is amplified by a power amplifier PA, and applied to the heater of vacuum thermocouple VT, which acts as a rectifier, filter, and low impedance output device. It will be understood that the described output device is adapted to supply conventional potentiometric equipment at a remote position for indicating, recording, control and the like purposes as desired. It should be noted also that the square law characteristic of the vacuum thermocouple compensates the nonlinearity of the absorption characteristic.

My novel analyzer is quickly and easily placed in use. The regulation of light source S is self-contained, as already described. Light trimmer 33 is adjusted where required for equalizing of the sample and reference beams before the test volume is admitted to sample cell 24. As heretofore mentioned, a suitable concentration of a reference medium is sealed in cell 23. The sample cell 24 is connected, as by fill and exhaust pipes 25, 26, to receive a continuous flow of the sample which is to be tested for the concentration of a gas or liquid component, which, as already noted, may be mixed with any number of additional components. The detector and ballast volumes are then filled with a fixed concentration of the component to be tested, or a component absorbing in a similar range. Said detecting and ballasting volumes are introduced preferably through valve 54 so as to urge diaphragm 45 towards rather than away from fixed electrode 57, and with bypass valve BP open. As hereinbefore mentioned passages 46, 56, and valve BP provide during such filling operation a desired means for bypassing the condenser microphone and for regulating the filling rate to avoid injury to diaphragm 45, the stressing or flexing of which is indicated by the described detector pressure registering system. It will be observed also that by the provision of fill and exhaust valves 54, 55 the detector unit is adapted for resensitizing in the field, which resensitizing is accomplished simply by bleeding the correct concentration through the detector cell, as described.

The speed of chop, or alternate interruption of the reference and sample beams is adjusted for maximum sensitivity as determined by the absorption time and the flexure characteristics of diaphragm 45, as modified by the bleed rate, and may be on the order of 5 cycles per second. The maximum sensitivity obtainable at any instant is dependent upon the component to be detected, since the amount of infrared absorption is different for each substance, and limited by the concentration of the component. It should be noted however, that the mentioned pressure seal for the detector chamber 41 permits a high concentration of the detector volume and affords the instrument a correspondingly high degree of sensitivity for the same component concentration. It will be understood that a similarly high level of sensitivity is achieved in the electronic indicating circuit already described. Relative values may be obtained from the sensitivity of the instrument to carbon monoxide, which has a relatively low infrared absorption of the common gases and hence a minimal sensitivity. For the preferred embodiment shown and described herein, the full scale sensitivity to carbon monoxide has been found to be on the order of 500 p. p. m. (parts per million) for 100% of chart with less than 0.25% background. The relative sensitivity for different gases is best illustrated by the carbon dioxide equivalent sensitivity which is 100 p. p. m. for 100% of chart with less than 0.25% background.

An alternative arrangement of the apparatus of the invention may be employed where interfering components are present in the sample volume. That is to say two or more components may be present in the sample which as in the case of carbon monoxide and carbon dioxide have absorbing ranges which overlap to some degree. In such instance an interference or filter chamber filled with a saturation of one or the other of the interfering components may be introduced between filter chamber 20 and detector unit D. The energy withdrawn from the sample beam by the interfering component will then be absorbed also from the reference beam, and the desired balance of the beams will be preserved as to the interfering component. The detector cell will thus reflect only energy changes caused by the desired test component.

The infrared method of component analysis has been found best suited to the measurement of a single component, as for example a specific impurity in a hydrocarbon gas mixture. It should be understood, however, that the present invention contemplates the use of the "concentrometer" for simultaneous multicomponent analysis. For such purpose, the apparatus is predeterminedly arranged to provide a through path for light beam 15, which is seen to pass successively and uninterruptedly through aligned filter chamber and detector cell windows 27, 28, 42, 43, as already described. The multicomponent analysis is thus effected by placing two or more detector units after the filter chamber in the path of the radiant column, each of the said units providing an absorbing volume appropriate to a component to be analyzed and each provided with measuring and indicating means.

Further exemplifying the ready application of the "concentrometer" to the simultaneous analysis of multiple components an alternative arrangement of the apparatus may be employed as for example in combustion control where measurement of the relative concentration of components is desired. For such combustion ratio determination two of the instruments are mounted in parallel, and provided with indicating and recording devices incorporating linear potentiometers which are coupled in known manner to provide the desired ratio. It will be seen that the ratio indication may be employed to govern the various gas or other fuel supplying means, thus establishing an automatic self-governing combustion control.

From the foregoing it will be appreciated that I have provided a sensitive and accurate positive filter infrared absorption device of unique design, using a single source and a single detecting element. The invention is characterized also by novel means for maintaining constant the radiation from said source and for dividing it equally into two beams which at the detector unit are representative of the light incident on and absorbed by a test sample. The invention further provides a desired means for insulating the detector from ambient changes in temperature and pressure and the like outside influences, and for sensitively detecting and accurately registering the pressure variations therein.

It will be understood that my invention, either as to product, means or method is not limited to the exemplary embodiments or steps herein illustrated or described, and I set forth its scope in my following claims:

1. In an absorption analyzer having a single source of infrared radiation, means including a sample volume and a non-absorbing reference volume for resolving the radiation into intermittent, alternate beams representative respectively of the energy incident upon and absorbed by the component to be analyzed, and a detector unit including an absorbing volume providing chamber disposed in the path of both said beams; means for registering the energy changes produced in said chamber by said beams comprising means including a chamber mounted pressure sensing element for converting the pressure pulses in said volume into electric signals representative of said energy changes; means associated with said last-named means for effecting frequency modulation of said signals; a frequency discriminator system connected to detect said frequency modulation; and an output device coupled thereto and comprising a low impedance filter rectifier adapted to supply a potentiometric device.

2. In combination with a source of infrared energy, an energy absorbing chamber, a component sample filter chamber and a non-absorbing reference column intermediate said source and said absorbing chamber; and means for alternately directing the energy from said source through said sample chamber and reference column; means for detecting the resultant energy changes in said absorbing chamber including a capacitance having a pressure sensing electrode movable responsive and proportional to said energy changes, means coupled thereto for producing a frequency modulated signal representative of the capacity changes, communicating means for effecting frequency demodulation of said signal, and an output device connected to said fraquency demodulation means and having a low impedance filter rectifier adapted to supply potentiometric means.

3. In combination, a source of infra-red rays, a body of material responsive to said rays, means for exposing said rays to absorption before reaching said body, means for modulating the incidence of said rays on said body, means for equalizing the pressure for long time changes due to ambient temperatures, and means for indicating the response of said material to said modulated rays comprising a variable capacitor responsive to said body, a source of alternating electrical energy, means responsive to said capacitor for modulating said energy, and means for indicating the value of said latter modulation.

4. In combination, means generating infra-red rays, a body of material pressure responsive to said rays, means for exposing said rays to absorption before reaching said body, means for modulating the incidence of said rays on said body, means for equalizing said pressure for long time changes due to ambient temperatures, and means for indicating the response of said material to the modulated rays comprising a variable capacitor responsive to said body, a source of alternating electrical energy, means coupling said variable capacitor and source of alternating electrical energy for modulating said alternating electrical energy in response to changes in said variable capacitor, and indicating means responsive to the modulated alternating electrical energy.

5. In combination, means generating infra-red rays, a plurality of beams of said rays, means alternately interrupting said beams, a body of material pressure responsive to said rays, means for exposing said rays of one beam to absorption before reaching said body and passing another of said beams through a reference medium, means for equalizing said pressure for long time changes due to ambient temperatures, and means for indicating the response of said material to the modulated rays comprising a variable capacitor responsive to said body, a source of alternating electrical energy, means coupling said variable capacitor and source of alternating electrical energy for modulating said alternating electrical energy in response to changes in said variable capacitor, and indicating means responsive to the modulated alternating electrical energy.

6. In combination, means generating infra-red rays, a plurality of beams of said rays, means alternately interrupting said beams, a body of material pressure responsive to said rays, means for exposing said rays of one beam to absorption before reaching said body and passing another of said beams through a reference medium, means for equalizing said pressure for long time changes due to ambient temperatures, and means for indicating the response of said material to the modulated rays comprising a variable capacitor responsive to said body, a radio frequency oscillator, means coupling said variable capacitor with said oscillator for modulating the frequency of the output of said oscillator, the output frequency of said oscillator being varied in response to changes in said variable capacitor, amplifying means coupled to said oscillator output, and indicating means connected to said amplifying means.

7. In combination, means generating infra-red rays, a body of material pressure responsive to said rays, means for exposing said rays to absorption before reaching said body, means for modulating the incidence of said rays on said body, means for equalizing said pressure for long time changes due to ambient temperatures, a means for indicating the response of said material to said modulated rays comprising a variable capacitor responsive to said body, a radio frequency oscillator, means coupling said variable capacitor with said oscillator for modulating the frequency of the output of said oscillator, the output frequency of said oscillator being varied in response to changes in said variable capacitor, amplifying means coupled to said oscillator output, and indicating means connected to said amplifying means.

8. In combination, means generating infra-red rays, a plurality of bodies of material pressure responsive to said rays mounted in the path of said rays, each having an absorption related to one of the components to be determined, means for exposing said rays to absorption before reaching said bodies, means for modulating the incidence of said rays on said bodies, means for equalizing said pressure for long time changes due to ambient temperatures in said bodies, and means for indicating the response of said material of each of the bodies to said modulated rays comprising a variable capacitor responsive to the body, a source of alternating electrical energy, means coupling said variable capacitor and source of alternating electrical energy for modulating said alternating electrical energy in response to change in said variable capacitor, and indicating means responsive to the modulated alternating electrical energy produced by each body.

References Cited in the file of this patent

UNITED STATES PATENTS

| | | |
|---|---|---|
| 2,431,019 | Barnes | Nov. 18, 1947 |
| 2,525,445 | Canada | Oct. 10, 1950 |
| 2,534,657 | Bray | Dec. 19, 1950 |

(Other references on following page)

UNITED STATES PATENTS

| | | |
|---|---|---|
| 2,545,162 | Muly et al. | Mar. 13, 1951 |
| 2,547,212 | Jamison et al. | Apr. 3, 1951 |
| 2,550,419 | Martin | Apr. 24, 1951 |
| 2,555,327 | Elliott | June 5, 1951 |
| 2,573,870 | Pfund | Nov. 6, 1951 |
| 2,605,426 | Martin | July 29, 1952 |
| 2,607,899 | Cary et al. | Aug. 19, 1952 |
| 2,642,536 | Heigl | June 16, 1953 |
| 2,648,775 | Waters | Aug. 11, 1953 |
| 2,668,243 | Williams | Feb. 2, 1954 |

FOREIGN PATENTS

| | | |
|---|---|---|
| 645,576 | Great Britain | Nov. 1, 1950 |

OTHER REFERENCES

Design of Double-Beam Analyzers, by G. Kiverson, Journal of the Optical Society of America, Feb. 1950, pages 112–118.